United States Patent

[11] 3,585,867

| [72] | Inventors | Edward Michael Grimshaw<br>Luton;<br>Ivan Yehudi Hirsh, Harrow, both of,<br>England |
|---|---|---|
| [21] | Appl. No. | 829,443 |
| [22] | Filed | June 2, 1969 |
| [45] | Patented | June 22, 1971 |
| [73] | Assignee | The English Electric Company Limited<br>London, England |
| [32] | Priority | May 31, 1968 |
| [33] | | Great Britain |
| [31] | | 26225/68 |

[54] ACTUATORS
9 Claims, 2 Drawing Figs.

[52] U.S. Cl. ..................................................... 74/89.15,
74/424.8
[51] Int. Cl. ....................................................F16h 21/02,
F16h 1/18
[50] Field of Search........................................... 74/89.15,
424.8 B

[56] References Cited
UNITED STATES PATENTS
1,777,115 9/1930 Bruback et al................ 74/424.8 B 3,151,842 10/1964 Ishai et al...................... 74/89.15
3,453,897 7/1969 Adinolfi ........................ 74/89.15
3,475,978 11/1969 Dunton ......................... 74/89.15

*Primary Examiner*—Fred C. Mattern, Jr.
*Assistant Examiner*—Wesley S. Ratliff, Jr.
*Attorneys*—Misegades and Douglas, Keith Misegades and George R. Douglas, Jr.

ABSTRACT: This invention relates to an actuator with a reversible output member, such as a nut, which is in driving engagement with an output shaft. The output member has, adjacent one end, driving engagement means, such as dogs, which engage with corresponding parts at the bottom of a recess at the end of the shaft, the main part of the output member either lying within, or projecting from, the shaft. The output member is secured in position by an externally threaded retainer which screws into the recess. The recess is provided by a tubular member which forms a permanent extension of the shaft.

ACTUATORS

This invention relates to actuators in which an output shaft is driven by a drive motor and is in driving engagement with an output member, such as a nut, which may, for example, be used to drive a cooperating threaded spindle for controlling a valve.

According to the present invention an actuator includes a drive motor; an output shaft driven by said motor and having a recess at its driving end and driving engagement means at the bottom of the recess; and an output member having external driving engagement means formed at or near one end of the member and arranged to engage with the driving engagement means of the output shaft with the member pointing in either of two directions.

The output member is preferably secured in driving engagement with the output shaft by an externally threaded retainer which is screwed into the recess and presses the driving engagement means into engagement.

This invention enables a given actuator to be used with the output member either contained wholly within the shaft or extending out of the shaft.

An example of an actuator according to this invention is shown in the accompanying drawings.

Figure 1:
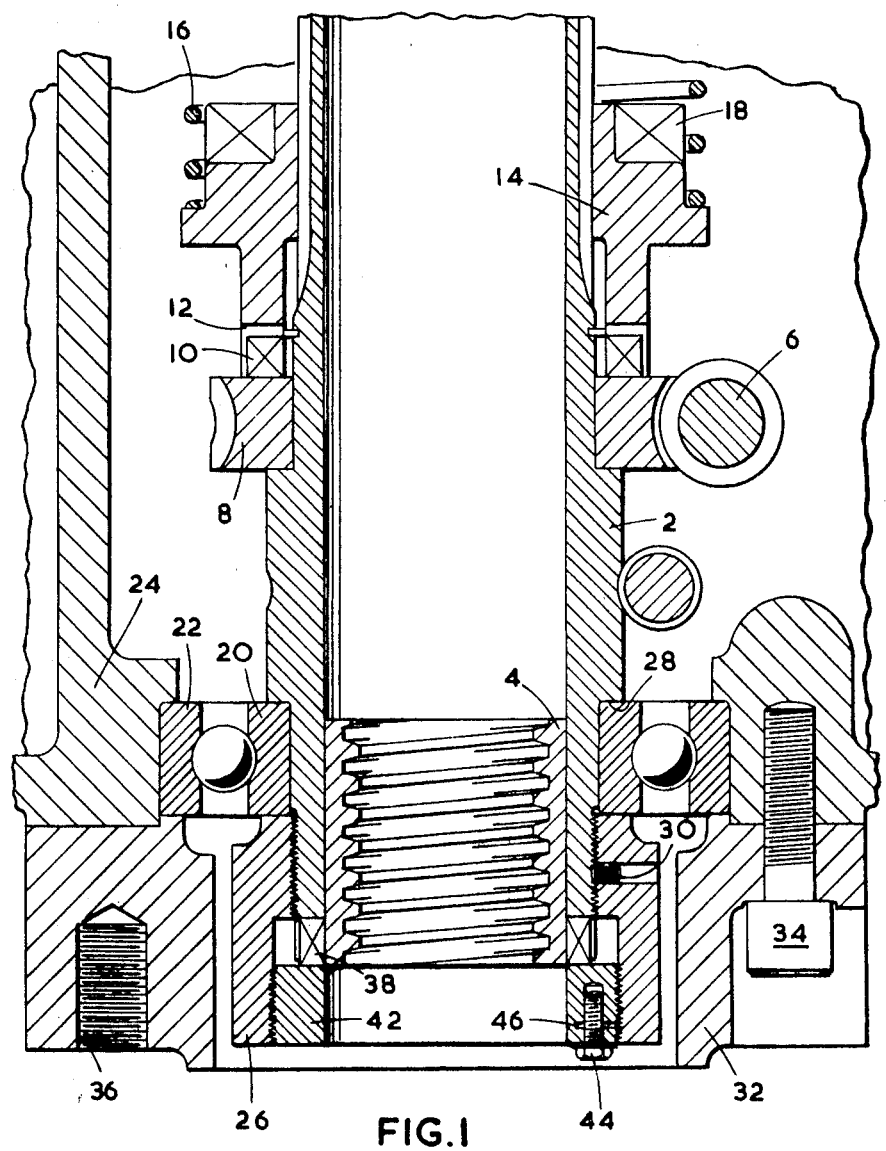
Figure 2:
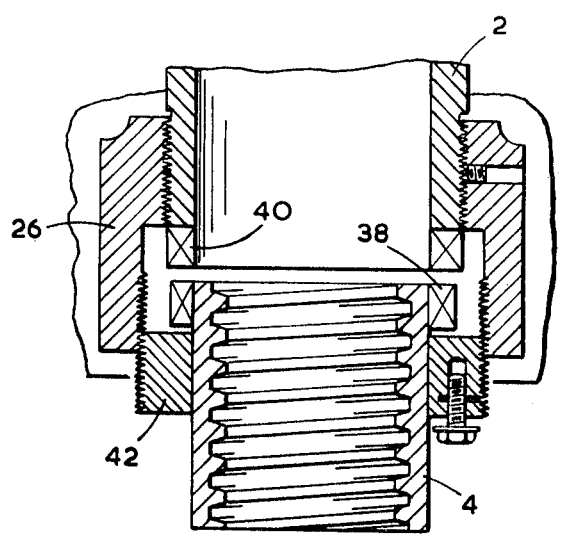

In these drawings:

FIG. 1 is a fragmentary longitudinal section showing the relevant parts of the actuator, with the nut lying wholly within the shaft; and FIG. 2 is a fragmentary section showing the nut being assembled in the opposite direction.

The actuator includes a hollow shaft 2 and a nut 4 which is intended to engage a threaded spindle. A worm 6 on a motor-driven shaft engages a worm wheel 8 which surrounds the shaft. Dog teeth 10 on the worm wheel engage cooperating teeth 12 on a clutch member 14 which is urged towards the worm wheel by a spring 16. The clutch member 14 is splined to the shaft. Accordingly, in the position shown, the clutch member is driven by the worm wheel and drives the shaft. In order to enable the shaft to be driven manually, the clutch member 14 can be moved axially out of engagement with the worm wheel and into engagement with a manual drive member (not shown) through dog teeth 18.

The shaft 2 is supported near its driven end by a ball bearing having an inner ace 20 and an outer race 22. The outer race is located in the casing 24 of the actuator.

The shaft has a recess defined by an extension part 26 which is screwed on to the main part of the shaft and which clamps the inner race 20 of the ball bearing against a shoulder 28 on the shaft. The extension part 26 is secured against rotation after assembly by a grub screw 30 and remains a permanent part of the shaft. Access to the grub screw can be obtained only after an end part 32 of the casing has been removed, this part being secured to the remainder of the casing by a number of screws 34. In use the end part 32 is secured, for example, to a mounting flange on a valve by screws engaging in threaded holes 36.

The nut 4 has external driving teeth 38 at one end. These teeth engage corresponding teeth 40 at the end of the main part of the shaft. Engagement of these teeth is maintained by an externally threaded retainer ring 42 which screws into the extension part 26 of the shaft and bears against the teeth 38 on the nut. After being screwed into position, the ring 42 is locked by means of a screw 44 passing through a slot 46 cut into the ring so that the thread on opposite sides of the slot is squeezed firmly to lock frictionally with the thread in the extension part 26.

The interengaging teeth 40 on the shaft and nut 38 may in effect comprise a pair of teeth on the end of the main part of the shaft which engage in slots in a flangelike formation around the nut.

FIG. 1 shows the nut 4 lying wholly within the shaft. As an alternative, the nut can point in the opposite direction so as to extend out of the shaft. FIG. 2 shows the nut being assembled into that position. Assembly is completed by moving the teeth 38 of the nut into engagement with the teeth 40 at the end of the main part of the shaft, after which the ring 42 is screwed into position to retain the nut.

In the arrangement in the drawings, the shaft of the actuator is in two parts, namely the main part 2 and the extension part 26 which is screwed on to the main part. As an alternative, these two parts may be integral, in which case the main part of the shaft on the worm wheel of the ball bearing would need to be reduced in diameter to enable the ball bearing to be placed over the shaft from the opposite end (i.e. from the end opposite to the nut). The inner race of the ball bearing may then be retained with respect to the shaft by means of a circlip or other fastening device.

Instead of a nut there may be any other form of output member, for example a plain sleeve with a keyway to rotate a spindle. In other words, the output member may be similar to the nut but without the internal thread.

We claim:

1. An actuator including a drive motor; an output shaft driven by said motor and having a recess at its driving end and driving engagement means at the bottom of the recess; an output member having external driving engagement means formed at or near one end of the member and arranged to engage with the driving engagement means of the output shaft with the member pointing in either of two directions; and clutch means operable to disconnect the drive between the motor and the output shaft and to connect the output shaft to manual operation means.

2. An actuator as claimed in claim 1, in which the output member is secured in driving engagement with the output shaft by an externally threaded retainer which is screwed into the recess and presses the driving engagement means into engagement.

3. An actuator as claimed in claim 1, in which the recess is formed by a hollow extension of the output shaft.

4. An actuator as claimed in claim 3, in which said extension comprises a separate member attached to the output shaft.

5. An actuator as claimed in claim 1, in which the output shaft is hollow.

6. An actuator as claimed in claim 5, in which said output member is arranged to lie alternatively mainly inside or mainly outside the output shaft.

7. An actuator as claimed in claim 1, in which the output member is a nut arranged to drive a threaded spindle for controlling a valve.

8. An actuator as claimed in claim 1, in which the output member is a sleeve having means to engage with a spindle which is to be rotated.

9. An actuator as claimed in claim 1, in which said driving engagement means comprise interengaging teeth.